United States Patent Office 2,895,918
Patented July 21, 1959

2,895,918

REACTIVATION OF POISONED SILVER CATALYSTS FOR THE OXIDATION OF ETHYLENE

Kenneth E. MacCormack, Ottawa, Ontario, Canada, assignor to National Research Council, Ottawa, Ontario, Canada, a body corporate No Drawing. Application January 5, 1954
Serial No. 402,395

6 Claims. (Cl. 252—412)

The present invention relates to a process for the reactivation of silver catalysts which have become poisoned so as to restore their activity for the oxidation of ethylene and other ethylenic hydrocarbons, and for enhancing the activity of such silver catalysts.

Silver catalysts in general, and in particular those of the type disclosed in the patents to Cambron and McKim, United States No. 2,562,857 and No. 2,562,858 may become poisoned or inactive in use. When subjected to certain sulfur or chlorine or halogen containing matter, e.g., hydrogen sulfide, sulfur dioxide, chlorine, other halogens or volatile chlorides or halides. In their poisoned condition, the activity of the catalyst is either greatly impaired or destroyed, or its selectivity is altered, and the process of the present invention provides a simple process of treating the catalyst so that its activity and selectivity is restored or improved, and in some instances the catalyst has greater activity than before poisoning.

Among the catalysts which can be treated by the process of the present invention are the silver catalysts which include those prepared from silver-calcium, silver-magnesium, silver-barium, silver-strontium, silver-calcium-magnesium, silver-barium-magnesium and other ternary alloys of silver and alkaline earth metals usually containing from 25 to 99% of silver and from which at least some, and sometimes all but a trace of the alkaline earth is removed by treatment with water or dilute acids, as exemplarily disclosed in said patents. Such catalysts may be used in granular or particulate form as a fluidized catalyst, or supported on metal supports or the alloy may form a fin, tube or other part in the reaction zone, and by treatment acquires its catalytic activity for the oxidation of ethylene and other alkenes to form ethylene oxide or other oxides.

Such catalysts have a relatively long life under normal operating conditions but are easily poisoned by contact with gases which contain sulfur, chlorine, fluorine, bromine, iodine, or chloride and halide, or sulphur containing compounds, and the catalyst requires treatment or complete reworking to render it again suitable for use. Additionally, the process may be used to enhance the activity of a silver catalyst although it has not been accidentally poisoned.

The present invention has for its object the provision of a novel and improved process for the treatment of silver containing catalysts which have become inactive in use through contamination with poisons, such as chlorine and sulfur. A further object is the provision of a process for the reactivation of silver alloy catalysts in a simple, reliable and economical manner. Still another object is the provision of a novel and improved process of enhancing the activity and selectivity of silver catalysts for the oxidation of ethylene and its homologues.

According to the process of the present invention the poisoned silver catalyst is treated with a solution of a hydrazine or hydroxylamine compound which is preferably free of chlorine, other halogens, halides and free sulfur. Thus, a granular or particulate catalyst formed from a silver-alkaline earth metal alloy and which has been poisoned in use as the oxidation catalyst for the oxidation of ethylene may be reactivated by immersion or other contact treatment with an alkaline aqueous solution of the monohydrate, mono or dinitrate, diformate, mono-oxalate, or the mono or disulfate, or hydrazine, or its methyl, ethyl, benzyl, phenyl, o-tolyl, p-tolyl or other water soluble homologues of hydrazine, or of hydroxylamine, or its methyl, ethyl, propyl, benzyl, phenyl, p-tolyl or other water soluble homologues of hydroxylamine. Of these hydrazine and hydroxylamine are preferred because of their availability and lower cost.

After treatment with the reactivating solution, the catalyst is washed with water and dried after which it is ready for reuse.

Other forms of the catalyst, such as metal supports coated with the catalyst may be similarly treated by immersion or contact with the treating solution.

In many instances, especially where the catalyst has been poisoned by sulfur compounds, it is found preferable to pretreat the poisoned catalyst with a halogen, preferably dilute gaseous chlorine, prior to reactivation, although this is not usually necessary.

The concentration of the reactivating agent may vary over a wide range from 0.01 M or less to 0.5 M or more, although from 0.1 to 0.2 M is generally preferred for the concentration of the hydrazine or hydroxylamine, while the excess alkalinity of the solution may vary from about 0.02 to 0.1 M or more excess alkali, usually sodium hydroxide.

The time of treatment may vary widely, but with a solution of 0.1 M to 0.2 M and with 0.02 M to 0.04 M excess alkali, the treatment time will vary from about 30 minutes to one hour or more at about 50° C., plus or minus 25° C.

In use, the reactivated catalyst usually increases in activity as it is used.

In a generally similar manner, catalysts which show an undesirably low activity or selectivity may have their activity and selectivity enhanced by intentionally poisoning them with chlorine, such as dilute chlorine, other halogen or hydrohalide gas, contained in air, or other diluent gas, such as nitrogen. Then, after reactivation in accordance with the process of the present invention, the catalyst is ready for reuse.

The following are specific examples of various processes in accordance with the present invention.

(1) A silver-calcium catalyst containing silver 91.5% and calcium 8.5% prepared and activated in accordance with the teaching of the patents to Cambron and McKim Nos. 2,562,857 and 2,562,858 oxidized 44.5% of the ethylene and of the ethylene so oxidized, 45.4% was converted to ethylene oxide in a given time at 250° C.

The catalyst was then intentionally poisoned with 0.5% chlorine in air, and was then reactivated by contact for 45 minutes at 50° C. with a 0.2 M solution of hydrazine sulfate made alkaline by the addtion of 0.24 M sodium hydroxide to give an excess alkalinity of 0.04 M. The catalyst was then washed with distilled water and dried in a stream of air at 100° to 150° C.

The catalyst was then again used for the oxidation of ethylene by passing a mixture of 15 parts air and one part ethylene over the catalyst at the same rate of flow and temperature as previously.

The following table shows the comparative results obtained:

| | Conversion of $C_2H_4$ to $C_2H_4O$ | Selectivity |
|---|---|---|
| | Percent | Percent |
| Catalyst before poisoning | 20.2 | 45.4 |
| Catalyst after poisoning | 4.3 | 86.0 |
| Reactivated and after 40 minutes | 25.1 | 64.9 |
| Reactivated and after 5 days | 36.9 | 65.1 |
| Reactivated and after 11 days | 38.8 | 63.7 |

(2) A similar catalyst was poisoned by dilute hydrogen sulfide and reactivated by a similar procedure giving the following results:

| | Conversion to $C_2H_4O$ | Selectivity |
|---|---|---|
| | Percent | Percent |
| Catalyst before poisoning | 22.6 | 45.2 |
| Catalyst after $H_2S$ poisoning | 2.0 | 66.7 |
| After reactivation | 25.7 | 57.5 |

(3) A silver-calcium catalyst had been used for the oxidation of ethylene with a conversion of $C_2H_4$ to $C_2H_4O$ of 33.3% and selectivity of 52% at 250° C. After poisoning with 0.5% chlorine in air the conversion was 9.0% and selectivity was 63.4%. Treatment for 45 minutes with a 0.1 M solution of hydrazine sulfate with 0.02 M excess sodium hydroxide at 50° C., followed by washing and air drying gave conversion of 30.2% and selectivity of 54.9% under similar conditions.

(4) A silver-calcium catalyst prepared as before was poisoned by 2% hydrogen sulfide in air for three minutes and was reactivated by a 0.2 M solution of hydrazine sulfate with 0.24 M sodium hydroxide (0.04 M excess) for 45 minutes at 50° C., then washed and air dried. This catalyst gave the following results:

| | $C_2H_4$ to $C_2H_4O$ | Selectivity |
|---|---|---|
| | Percent | Percent |
| Catalyst before poisoning | 30.7 | 53.2 |
| Catalyst after $H_2S$ poisoning | 7.0 | 50.0 |
| Catalyst after reactivation | 29.7 | 50.8 |

(5) A catalyst was treated in the same manner as in the preceding example except that it was poisoned by 1% sulfur dioxide in air for four minutes, giving the following results:

| | $C_2H_4$ to $C_2H_4O$ | Selectivity |
|---|---|---|
| | Percent | Percent |
| Catalyst before poisoning | 23.5 | 53.1 |
| Catalyst after $SO_2$ poisoning | 7.1 | 37.8 |
| Catalyst after reactivation | 19.9 | 45.6 |

(6) A similar catalyst was similarly poisoned with sulfur dioxide, and then with 0.5% chlorine gas in air, after which it was reactivated with 0.2 M hydrazine sulfate with 0.04 M sodium hydroxide, giving the following results:

| | $C_2H_4$ to $C_2H_4O$ | Selectivity |
|---|---|---|
| | Percent | Percent |
| Catalyst before poisoning | 36.0 | 46.2 |
| Catalyst after $SO_2$ poisoning | 20.8 | 38.9 |
| Catalyst after $Cl_2$ poisoning | 17.9 | 75.5 |
| Catalyst after reactivation | 30.7 | 52.7 |

(7) A similar catalyst poisoned with 0.5% chlorine in air and then treated with 0.2 M phenylhydrazine sulfate rendered alkaline with an equal volume of 0.24 M sodium hydroxide, washed and dried in air gave the following results:

| | $C_2H_4$ to $C_2H_4O$ | Selectivity |
|---|---|---|
| | Percent | Percent |
| Catalyst before poisoning | 29.1 | 48.9 |
| Catalyst after $Cl_2$ poisoning | 4.0 | 54.8 |
| Catalyst after reactivation | 23.0 | 47.5 |
| Catalyst 5 days after reactivation | 26.4 | 50.7 |

(8) The catalyst of Example 7 was again poisoned with chlorine and was again reactivated using a 0.2 M solution of hydroxylamine sulfate made alkaline with an equal volume of 0.24 M sodium hydroxide, giving results as follows:

| | $C_2H_4$ to $C_2H_4O$ | Selectivity |
|---|---|---|
| | Percent | Percent |
| Catalyst poisoned with $Cl_2$ | 2.5 | 37.9 |
| Catalyst after reactivation | 18.8 | 44.7 |
| Catalyst after eight days use | 23 | 47 |

The invention in its broader aspects is not limited to the specific steps, processes and compositions shown and described but departures may be made therefrom within the scope of the accompanying claims without departing from the principles of the invention and without sacrificing its chief advantages.

What is claimed is:

1. A process of reactivating a poisoned silver catalyst to be used in the oxidation of ethylene hydrocarbons, which comprises treating a catalyst poisoned by contact with gases containing an agent selected from the group consisting of sulphur, halogens, halides and sulphur-containing compounds with an aqueous alkaline solution of a reactivating agent selected from the group consisting of the hydrates and salts of hydrazine, hydroxylamines and their water-soluble homologues.

2. A process according to claim 1, in which the solution is substantially free of halogens, halides and free sulphur.

3. A process according to claim 1, in which the reactivating agent is hydrazine.

4. A process, as defined in claim 1, in which the reactivating agent is hydroxylamine.

5. A process of increasing the selectivity of a silver catalyst for the oxidation of ethylenic hydrocarbons, which comprises poisoning the silver catalyst with a halogen and reactivating the poisoned catalyst by treatment with an aqueous alkaline solution of a reactivating agent selected from the group consisting of the hydrates and salts of hydrazine, hydroxylamine and their water-soluble homologues.

6. A process according to claim 5, in which the alkaline solution is substantially free of halogens, halides and free sulphur-containing compounds.

References Cited in the file of this patent

UNITED STATES PATENTS

| | | |
|---|---|---|
| 2,194,602 | Law et al. | Mar. 26, 1940 |
| 2,424,083 | Finch et al. | July 15, 1947 |
| 2,424,085 | Bergsteinsson et al. | July 15, 1947 |
| 2,479,884 | West et al. | Aug. 23, 1949 |
| 2,479,885 | West | Aug. 23, 1949 |